(12) United States Patent
Nishikawa

(10) Patent No.: US 9,104,357 B2
(45) Date of Patent: Aug. 11, 2015

(54) IMAGE FORMING SYSTEM, IMAGE FORMING APPARATUS AND SERVER

(71) Applicant: Naoki Nishikawa, Nagoya (JP)

(72) Inventor: Naoki Nishikawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/076,366

(22) Filed: Nov. 11, 2013

(65) Prior Publication Data

US 2014/0168692 A1    Jun. 19, 2014

(30) Foreign Application Priority Data

Dec. 18, 2012  (JP) .................................. 2012-275771

(51) Int. Cl.
*G06F 3/12*  (2006.01)
*G06K 1/00*  (2006.01)

(52) U.S. Cl.
CPC .............. *G06F 3/1247* (2013.01); *G06F 3/122* (2013.01); *G06F 3/1238* (2013.01); *G06F 3/1267* (2013.01); *G06F 3/1288* (2013.01)

(58) Field of Classification Search
CPC ..... G06F 3/124; G06F 3/1213; G06F 3/1204; G06F 3/1236; G06F 3/1232
USPC .............. 358/1.1, 1.2, 1.4, 1.5, 1.6, 1.9, 1.11, 358/1.12, 1.13, 1.14, 1.15, 1.16, 1.17, 1.18
See application file for complete search history.

(56) References Cited

U.S. PATENT DOCUMENTS

| 2002/0060809 | A1* | 5/2002 | Aoki ............................ 358/1.15 |
| 2009/0213415 | A1* | 8/2009 | Shozaki ...................... 358/1.15 |
| 2012/0120445 | A1  | 5/2012 | Kuroshima |

FOREIGN PATENT DOCUMENTS

| JP | 2003333267 A | 11/2003 |
| JP | 2010023405 A | 2/2010 |
| JP | 2012108621 A | 6/2012 |

* cited by examiner

*Primary Examiner* — Thierry L Pham
(74) *Attorney, Agent, or Firm* — Scully, Scott, Murphy & Presser, P.C.

(57) ABSTRACT

An image forming system includes an image forming apparatus, and a server which communicates with the image forming apparatus. The image forming apparatus requests a transmission of image data to the server, receives, from the server, conversion data which is image data converted by the sever according to a conversion condition, and performs printing based on the conversion data. The server converts the image data requested to be transmitted according to the conversion condition to generate the conversion data from the image data, and transmits the generated conversion data to the image forming apparatus. At least one of the server and the image forming apparatus further determines the conversion condition based on specific information of the image forming apparatus.

20 Claims, 8 Drawing Sheets

IMAGE FORMING SYSTEM, IMAGE FORMING APPARATUS AND SERVER

CROSS-REFERENCE TO RELATED APPLICATION

This application claims priority from Japanese Patent Application No. 2012-275771, filed on Dec. 18, 2012, the entire subject matter of which is incorporated herein by reference.

TECHNICAL FIELD

Aspects of the present invention relate to an image forming system, an image forming apparatus and a server, and more particularly, to a technique that an image forming apparatus downloads image data from a server which stores the image data and forms an image based on the downloaded image data.

BACKGROUND

There has been know an image forming system including a distribution server which distributes image data, and an image forming apparatus which communicates with the distribution server to download the image data from the distribution server and performs printing based on the downloaded image data.

For example, in an image forming system, image data stored in a server is downloaded to a printer to perform printing. In this image forming system, the server stores a print job which is registered in advance by a user. After authenticating a user, the printer obtains a job list of the user from the server. Then, when a print job is selected from the job list, the printer downloads the selected print job from the server and performs printing.

However, the above-described image forming system has the following problems. That is, in the image forming system which downloads the image data stored in the server to the image forming apparatus to print the image data, the image data stored in the server is downloaded regardless of a state of the image forming apparatus and print settings which are input to the image forming apparatus. In this configuration, however, there occurs a case where image data having a size which is larger than image data required for printing is downloaded, which would cause a problem of using an unnecessary area of memory of the image forming apparatus, and/or a problem of increasing an unnecessary load on a network.

SUMMARY

Accordingly, an aspect of the present invention provides a technique of reducing a load on memory of an image forming apparatus or a load on a network in an image forming system which downloads image data stored in a server to the image forming apparatus to print the image data.

According to an illustrative embodiment of the present invention, there is provided an image forming system comprising an image forming apparatus, and a server configured to communicate with the image forming apparatus. The image forming apparatus comprises: a first controller configured to receive a selection of image data to be printed from image data stored in the server; and request a transmission of the selected image data to the server; a receiving device configured to receive, from the server, conversion data which is image data converted by the server according to a conversion condition for converting the image data selected by the first controller; a storage device configured to store the conversion data received by the receiving device; and a printing device configured to perform printing based on the conversion data stored in the storage device. The server comprises: a second controller configured to convert the image data requested to be transmitted by the first controller according to the conversion condition to generate the conversion data from the image data; and a transmitting device configured to transmit the conversion data generated by the second controller to the image forming apparatus. At least one of the first controller of the image forming apparatus and the second controller of the server is further configured to determine the conversion condition based on specific information which the image forming apparatus has.

According to the above configuration, the image forming apparatus acquires image data (conversion data) converted by the server based on the specific information of the image forming apparatus. Accordingly, the possibility that the image data having a size which is larger than the image data necessary for printing in the image forming apparatus is transmitted is reduced. As a result, the reduction in the load on the network or the memory (storage device) of the image forming apparatus can be expected.

According to another illustrative embodiment of the present invention, there is provided an image forming apparatus. The image forming apparatus comprises: a receiving device; a printing device; and a controller. The controller is configured to: receive a selection of image data to be printed from image data stored in a server; determine a conversion condition for converting the selected image data by the server, based on specific information which the image forming apparatus has; transmit, to the server, the determined conversion condition and a transmission request for the selected image data; and control the printing device to perform printing based on the conversion data which is image data converted by the server according to the conversion condition and received by the receiving device from the server in response to the transmission request.

According to a further illustrative embodiment of the present invention, there is provided a server comprising a transmitting device, and a controller. The controller is configured to: obtain specific information which an image forming apparatus has; determine a conversion condition for converting image data selected by the image forming apparatus, based on the obtained specific information; convert image data requested to be transmitted from the image forming apparatus according to the determined conversion condition to generate conversion data from the image data; and transmit the conversion data to the image forming apparatus via the transmitting device.

According to the above configuration, in the image forming system which downloads image data stored in the server to the image forming apparatus to perform printing, a load on the network or on the memory of the image forming apparatus can be reduced.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, an image forming system according to illustrative embodiments of the present invention will be described in detail with reference to the accompanying drawings. In the illustrative embodiments, an inventive concept of the present invention is applied to an image forming system including a multifunction peripheral (MFP) having a printing function and a reading function, and a server which provides image data to the MFP.

Figure 1:
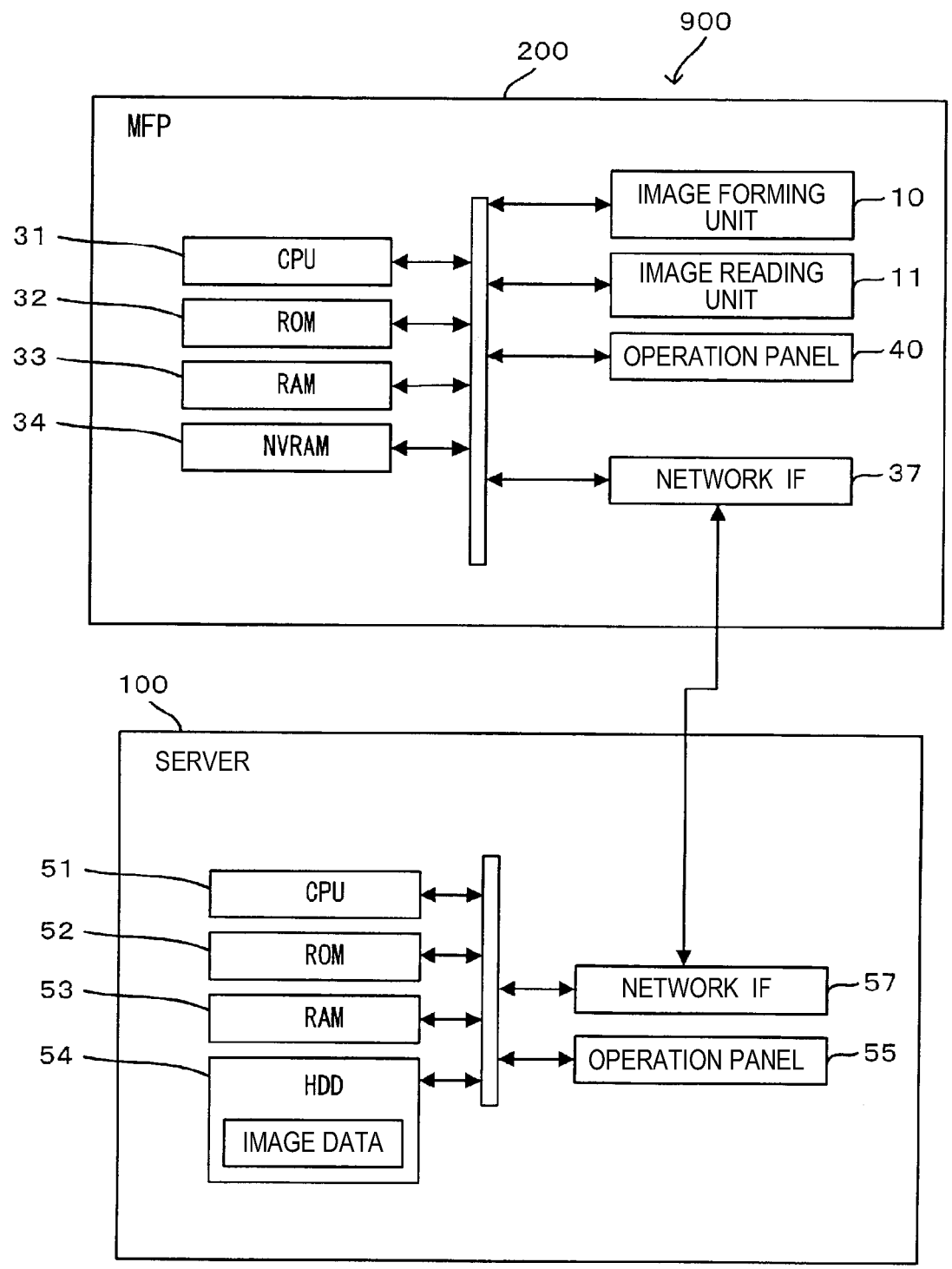
FIG. 1 is a block diagram showing a configuration of an image processing system according to an illustrative embodiment.

As shown in FIG. 1, an image forming system 900 according to the illustrative embodiment includes a server 100, and a MFP 200 (an example of an image forming apparatus). The server 100 stores image data and transmits the image data to a request device in response to a download request. The MFP 200 requests a downloading of image data from the server 100, and receives the image data from the server 100 to perform printing of the image data. Incidentally, the image forming system 900 may include other image forming apparatuses for printing image data, in addition to the MFP 200. Also, the image forming system may include other servers for providing image data, in addition to the server 100.

In the image forming system 900, a user operates the MFP 200 to input print settings and select image data to be printed. Then, the MFP 200 requests a downloading of the image data from the server 100, and performs printing based on the image data downloaded from the server 100. Hereinafter, the printing according to the above-described procedure is referred to as "download printing".

Subsequently, a schematic configuration of the MFP 200 will be described. As shown in FIG. 1, the MFP 200 includes a CPU 31 (an example of a first controller), a ROM 32, a RAM 33 (an example of a storage device), and a Non-Volatile RAM (NVRAM) 34. Further, the MFP 200 includes an image forming unit 10 (an example of a printing device) which prints an image on a sheet, an image reading unit 11 which reads an image of an original, an operation panel 40 (an example of an input device) which performs a display of an operating status or accepts an input operation by a user, and a network interface 37 (an example of a receiving device). The image forming unit 10, the image reading unit 11, the operation panel 40 and the network interface 37 are controlled by the CPU 31.

The image forming unit 10 may be capable of performing color printing or only monochrome printing. In this illustrative embodiment, it is assumed that the image forming unit 10 is capable of color printing. Further, the printing method of the image forming unit 10 may be an electrophotographic method or an ink jet method. Further, the image reading unit 11 may be capable of performing a color scanning or only a monochrome scanning. In this illustrative embodiment, it is assumed that the image reading unit 11 is capable of color scanning. Further, the reading mechanism of the image reading unit 11 may be a CCD or a CIS.

The ROM 32 stores a firmware, which is a control program for controlling the MFP 200, or various setting values. The RAM 33 and the NVRAM 34 are used as a work area in which various control programs are read, or a storage area for temporarily storing data.

The CPU 31 controls each component of the MFP 200 while storing the processing results in the RAM 33 or the NVRAM 34, in accordance with signals sent from various sensors or the control program read out from the ROM 32.

The network interface 37 is an interface which enables communication with other devices. The MFP 200 may perform, for example, a transmission of the download request to the server 100 or a reception of data, via the network interface 37.

The operation panel 40 is provided on an exterior of the MFP 200, and has various buttons which accepts a user's input, and a touch panel which displays message or setting contents. The various buttons include, for example, an OK button for inputting a print start command, or a cancel button for inputting a cancel instruction of printing. Further, various inputs may be accepted through the touch panel by the user's touch operation, for example, personal identification numbers or print settings are input through the touch panel.

Subsequently, a schematic configuration of the server 100 will be described. As shown in FIG. 1, the server 100 includes a CPU 51 (an example of a second controller), a ROM 52, a RAM 53, and a HDD 54. Further, the server 100 includes an operation panel 55 having a touch panel which has an input function and a display function, and a network interface 57 (an example of a transmitting device) which enables communication with an external device. And, those components are controlled by the CPU 51.

In the HDD 54 of the server 100, an OS, a web browser for viewing data on the Internet, a device driver for controlling various devices and the like are installed. In addition, at least one image data is also stored in the MD 54. The image data stored in the HDD 54 may be any file of common image formats such as JPEG, GIF, bitmaps, etc.

The CPU 51 performs various processes while storing the calculation results in the RAM 53 or HDD 54 in accordance with a program read out from the HDD 54 and the control program read out from the ROM 52.

The network interface 57 is an interface to enable communication with other devices in the same manner as the network interface 37 of the MFP 200. The server 100 can perform transmission of data, for example, to the MFP 200, via the network interface 57.

The server 100 has a function of converting image data according to a predetermined conversion condition to generate conversion data from the image data. For example, with respect to a function of converting a size (width and height) of image data to fit a predetermined size, the height or width of the image data is set as a conversion condition. Further, with respect to a function of converting a color image to a monochrome image, whether the color designation is a monochrome printing or color printing is set as a conversion condition. In the present illustrative embodiment, it is assumed that the server 100 can perform at least a size conversion and a color conversion as a conversion mode of the image data, as described above.

Figure 2:
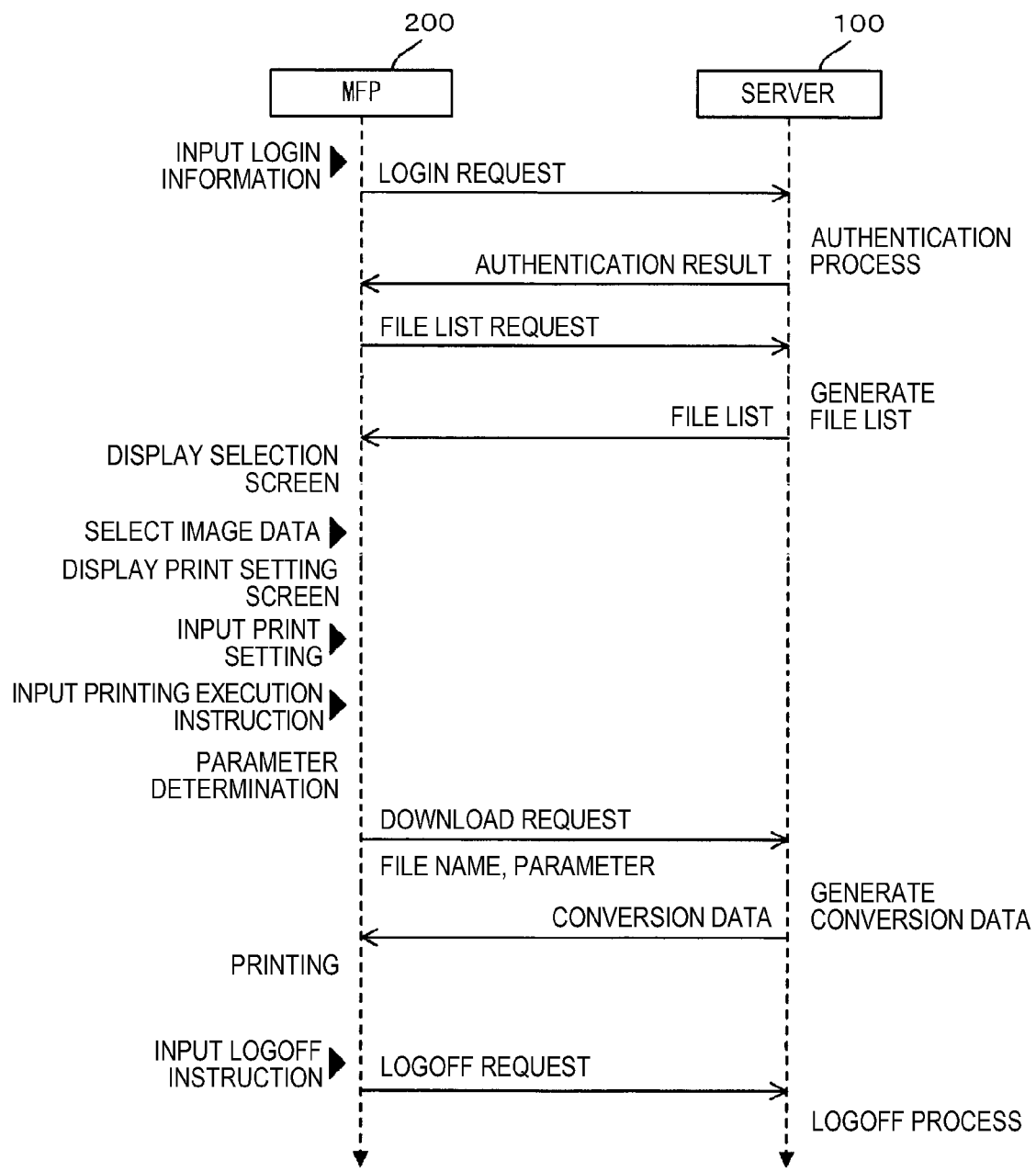
FIG. 2 is a sequence diagram showing a procedure of data communication between a server and a multifunction peripheral (MFP) in a download printing according to a first illustrative embodiment.

Subsequently, detailed procedure of a download printing executed by the image forming system 900 will be described with reference to the sequence diagram of FIG. 2.

In the download printing according to the first illustrative embodiment, first, the MFP 200 accepts an input of login information. The login information is personal information to log-in to the server 100, for example, the login information is configured by a password and identifier of a user. The login information is input by the user operating the operation panel 40.

When the login information is input, the MFP 200 transmits a login request to the server 100. The login request includes the login information input. Upon receiving the login information, the server 100 performs authentication process. And, the server 100 responds to the MFP 200 with the authentication result. In the following description, it is assumed that the login is authorized (allowed) by the authentication process.

When the login is allowed, the MFP 200 transmits a file list request which requests a transmission of a file list of printable image data of the logged-in user who is allowed to log-in to the server 100. User information which identifies the logged-in user is added to the file list request. According to the file list request from the MFP 200, the server 100 generates a file list of the image data which the logged-in user can print, and responds to the MFP 200 with the file list. The file list includes both thumbnail image of the image data and file name of the image data.

Figure 3:
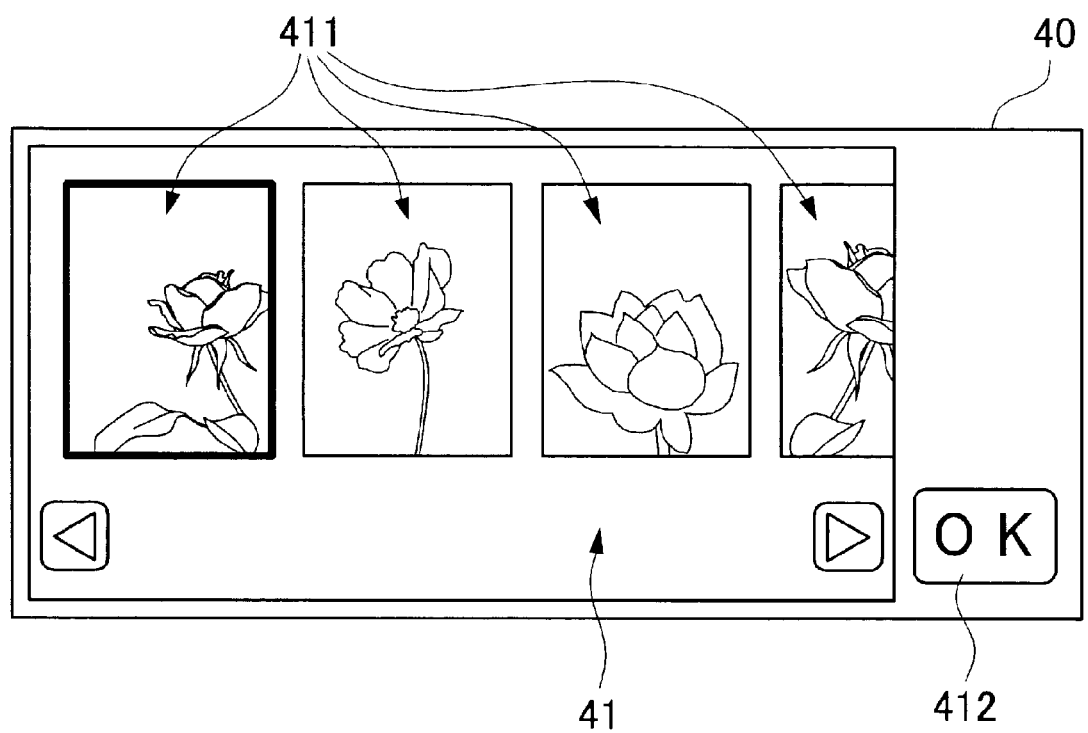
FIG. 3 is a view showing a file selection screen displayed on the MFP.

Upon receiving the file list, the MFP 200 displays a selection screen including a list of printable image data for selecting image data to be printed from among the printable image data, on the operation panel 40. FIG. 3 shows the configuration of the selection screen 41 displayed on the operation panel 40. In the present illustrative embodiment, when thumbnail images 411 are displayed on the selection screen 41, the user touches a thumbnail image 411, so that a frame of the thumbnail image 411 touched is highlighted. Then, the image data corresponding to the thumbnail image becomes a selected state. Further, by the user touching the image data of the selected state, the frame of the thumbnail image 411 touched returns to a normal state, and the image data becomes a non-selected state. Then, when the user touches the OK button 412, the image data of the selected state is selected as a print target.

Figure 4:
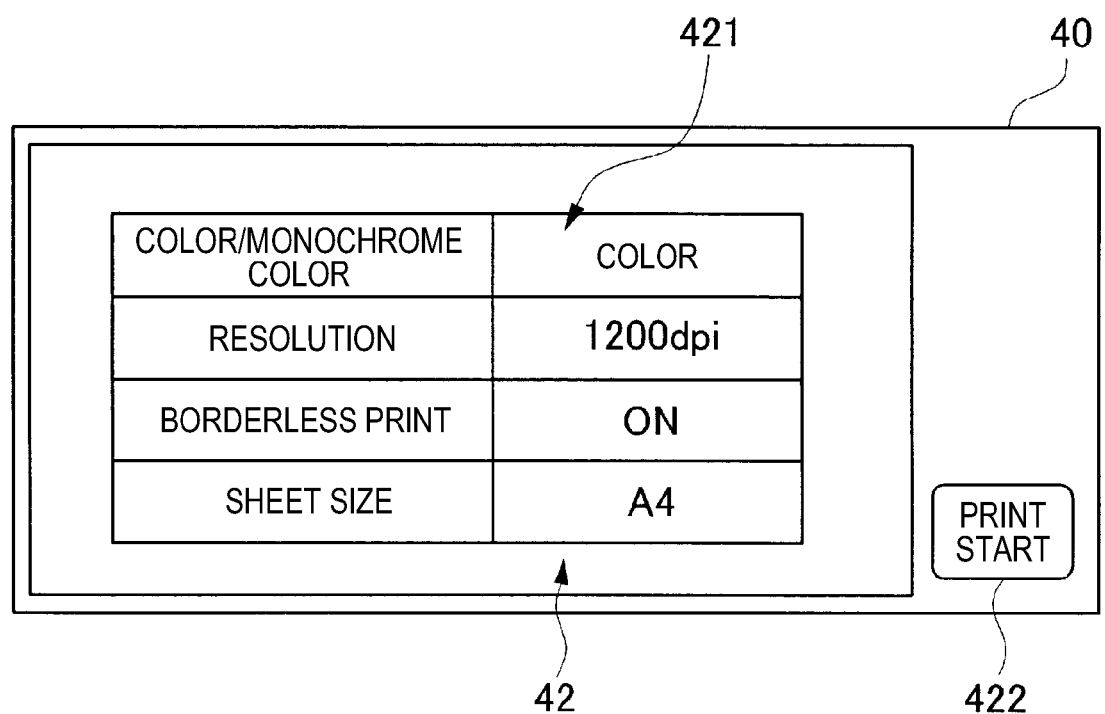
FIG. 4 is a diagram showing a print setting screen displayed on the MFP.

When the image data is selected, the MFP 200 displays, on the operation panel 40, a print setting screen which accepts a change of the print settings. FIG. 4 shows a configuration of a print setting screen 42 displayed on the operation panel 40. In the print setting screen 42, the initial setting is first displayed. The initial values of the print settings may be read out from the ROM 32, or may be obtained from the server 100 every time the print setting screen 42 is displayed. In the print setting screen 42, setting items can be changed by the user touching a field 421 of each setting item. Further, by the user touching a print start button 422, a print execution instruction is input.

When the print execution instruction is input, the MFP 200 determines, according to the status of the device (MFP) or the print settings, the parameters which are conversion conditions of image data executed on the server 100. The determination method of the parameters will be described later. Thereafter, the MFP 200 sends a download request which requests the downloading of the selected image data to the server 100. The download request includes the file name of the selected image data and the parameters.

Upon receiving the download request, the server 100 reads out the image data selected, and generates conversion data obtained by converting the image data according to the parameters sent from the MFP 200. That is, by using the conversion function of the server 100, the server 100 generates the conversion data obtained by converting the image data selected by the MFP 200 to image data having a size set by parameters. Further, if the image data is a color image and the color designation set in the parameters is a monochrome printing, the server 100 generates the conversion data of monochrome image. Then, the conversion data is transmitted to the MFP 200.

After receiving the image data (conversion data), the MFP 200 starts printing based on the image data. After that, the MFP 200 accepts the input of logoff instruction. Upon receipt of the logoff instruction, the MFP 200 transmits a logoff request to the server 100. Upon receipt of the logoff instruction, the server 100 performs the logoff process. When the logoff process is completed, the download printing is completed.

Figure 5:
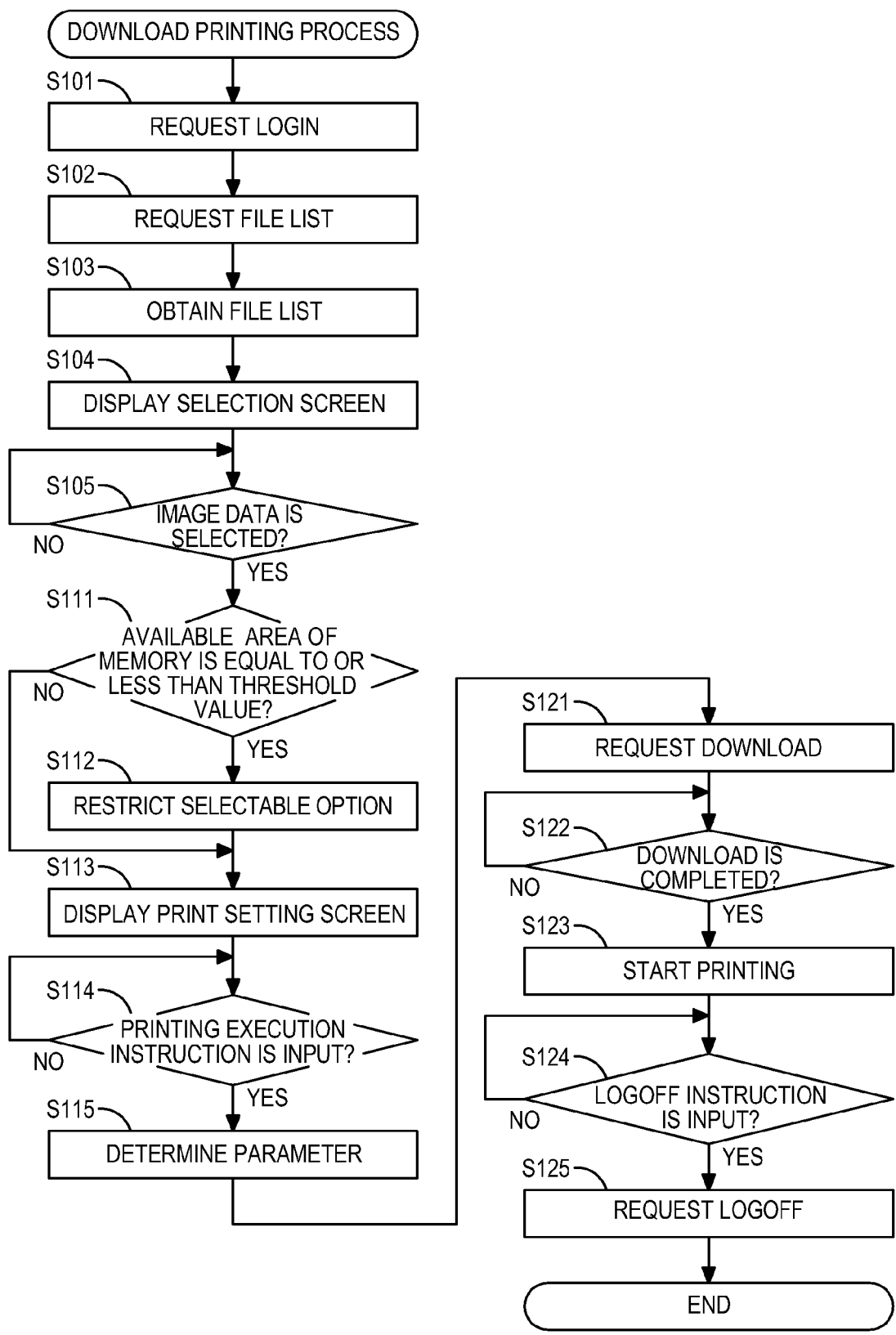
FIG. 5 is a flowchart showing a procedure of the download printing process by the MFP.

Subsequently, a download printing process performed by the MFP 200 to realize the above-described download printing will be described with reference to the flowchart of FIG. 5. When the login information is input in the MFP 200, the download printing process is executed by the CPU 31.

In the download printing process, first, the login request is transmitted to the server 100 (S101). After S101, the authentication result is acquired from the server 100, and the file list request is transmitted to the server 100, on a condition that the login is allowed (S102). The description of the case where the login is not allowed is omitted. After S102, the file list is obtained from the server 100 (S103).

After S103, the selection screen 41 is displayed on the operation panel 40 (S104). The selection screen 41 displays the thumbnail image stored in the file list. Then, it is determined whether image data to be printed is selected (S105). That is, in a state where at least one image data is selected, it is determined whether the OK button 412 is touched. When the image data is not selected (S105: NO), the process stands until the image data is selected.

When the image data is selected (S105: YES), it is determined whether an available area of the memory of the MFP 200 itself is equal to or less than a threshold value (S111). The available area of the memory mentioned here may be an available area of the whole RAM 33, or may be an available area of an area reserved as a storage area of the image data. If the available area is equal to or less than the threshold value (S111: YES), a selectable option which can be set in the print setting screen 42 is restricted (S112). For example, the color printing or the high resolution may be deleted from the selectable option so as not to be selected. Alternatively, "non-selectable" indication may be displayed. Further alternatively, when the limited option were selected, the possibility of that a memory is full may be warned.

Incidentally, the restriction of the selectable option of the print settings may be determined, for example, according to whether the color image is formed, in addition to the available area of the memory. That is, if the formation of a color image is not available, the color image may be deleted from the selectable option so as not to be selected in the print settings. Incidentally, whether MFP 200 can perform a color printing is determined based on the capability of MFP 200 which is a constant parameter or based on whether there remains sufficient color agent which is a variable parameter. Further, if the server 100 does not have a conversion function of converting a color image to a monochrome image as a function of the conversion server 100, the selectable option of the color designation may be also restricted. The conversion function of the server 100 may be inquired to the server 100, or may be stored in the MFP 200 in advance. Also, even with respect to the output size, the selectable option of the output size may be restricted to correspond to a sheet size set in the sheet feeding tray. For example, when the MFP 200 does not include a sheet feeding tray set for an A4 size, the option for selecting A4 size may be deleted from the selectable option so that the A4 size cannot be selected in the print setting.

After S112, or if it is determined that the available area is greater than the threshold value at S111, the print setting screen 42 is displayed (S113). In S113, the restriction on the selectable option in S112 is reflected on the print setting screen 42. Thereafter, it is determined whether the print execution instruction is input (S114). In other words, it is determined whether the print start button 422 is touched. When the print execution instruction is not input (S114: NO), the process stands until the print execution instruction is input. Incidentally, when the print settings are changed before the print execution instruction is input, the changes are reflected on the print setting screen 42.

When the print execution instruction is input (S114: YES), it is determined the parameters corresponding to the print settings (S115). The parameters include the image size and color designation. The color designation is determined as color printing or monochrome printing based on the contents set in the color designation of the print settings while referring to the state and capability of the own device. That is, if the color designation of the print setting indicates a monochrome printing, it is determined as a monochrome color. If the color designation of the print setting indicates a color printing, it is determined a color printing or a monochrome printing based on capability of forming the color image. The capability of forming the color image may depend on a capability of the MFP 200 which is a constant parameter or on whether there remains sufficient color agent, which is a variable parameter. Incidentally, when the server 100 does not have a conversion function of converting a color image to a monochrome image, the color designation may not be included in the parameters.

Figure 6:
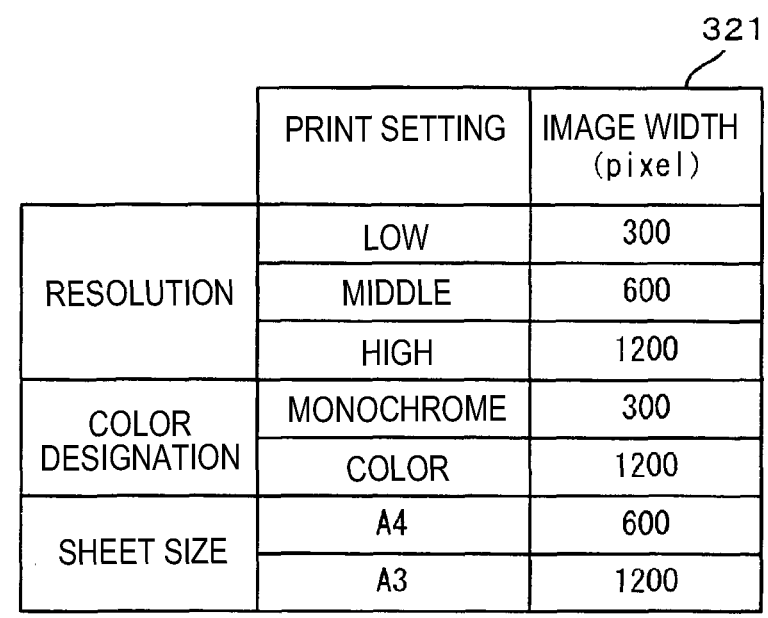
FIG. 6 is a view showing a database for determining parameters.

On the other hand, the image size is also determined according to the contents set by the color designation in the print settings. In more detail, the ROM 32 stores a table 321 which sets an image width appropriate for each of the contents of the print settings as shown in FIG. 6, and the MFP 200 determines a suitable image width for each print setting. Of the image width obtained for each print setting, the maximum width is determined as a parameter of image size. Incidentally, the image height is set at a magnification equivalent to that of the image width. The image width described herein refers to the number of pixels in the lateral direction of the image, and the image height indicates the number of pixels in the vertical direction of the image. For example, if the resolution is middle, the color designation is a color printing, and the out size is A4, the image width obtained from the resolution is 600 pixels, the image width obtained from the color designation is 1200 pixels, the image width obtained from the output size is 600 pixels, and the maximum value "1200 pixels" of the image width is determined as a parameter of the image size. When the server 100 does not have a conversion function of converting a color image to a monochrome image, the image width obtained from the color designation is not considered.

Further, in the determination of the parameters of the image size, the status and the capability of the own device may be used in addition to the print settings. For example, if the available area of the memory of the own device is small, since there is a possibility that the memory becomes full when the image data is downloaded, it may determine the parameter of the image size is a smaller size according to the available area of the memory. Further, for example, the parameters may be determined by the capability of forming the color image. That is, since the setting of the color printing is useless if a color image cannot be formed, the image width may be changed to that of the monochrome printing.

After S115, a download request is transmitted to the server 100 (S121). The file name of the selected image data and the parameter determined in S115 are added to the download request. With this download request, downloading of the selected image data is started. Incidentally, in the server 100, the conversion data according to the parameters is generated from the selected image data. Then, the conversion data is transmitted from the server 100.

After S121, it is determined whether the download is completed (S122). When the download is not completed (S122: NO), the process stands until the download ends. When the download is completed (S122: YES), the received conversion data is expanded, and the image forming unit 10 start printing of the conversion data (S123). Incidentally, there is no need to wait for the reception of the whole conversion data, but the MFP 200 may start printing when the MFP 200 has received the conversion data to a certain amount which enables printing.

After S123, it is determined whether the logoff instruction is input (S124). If the logoff instruction is not input (S124: NO), the process stands until the logoff instruction is input. When the logoff instruction is input (S124: YES), the logoff request is transmitted to the server 100 (S125). After S125, the download printing process ends.

Figure 7:
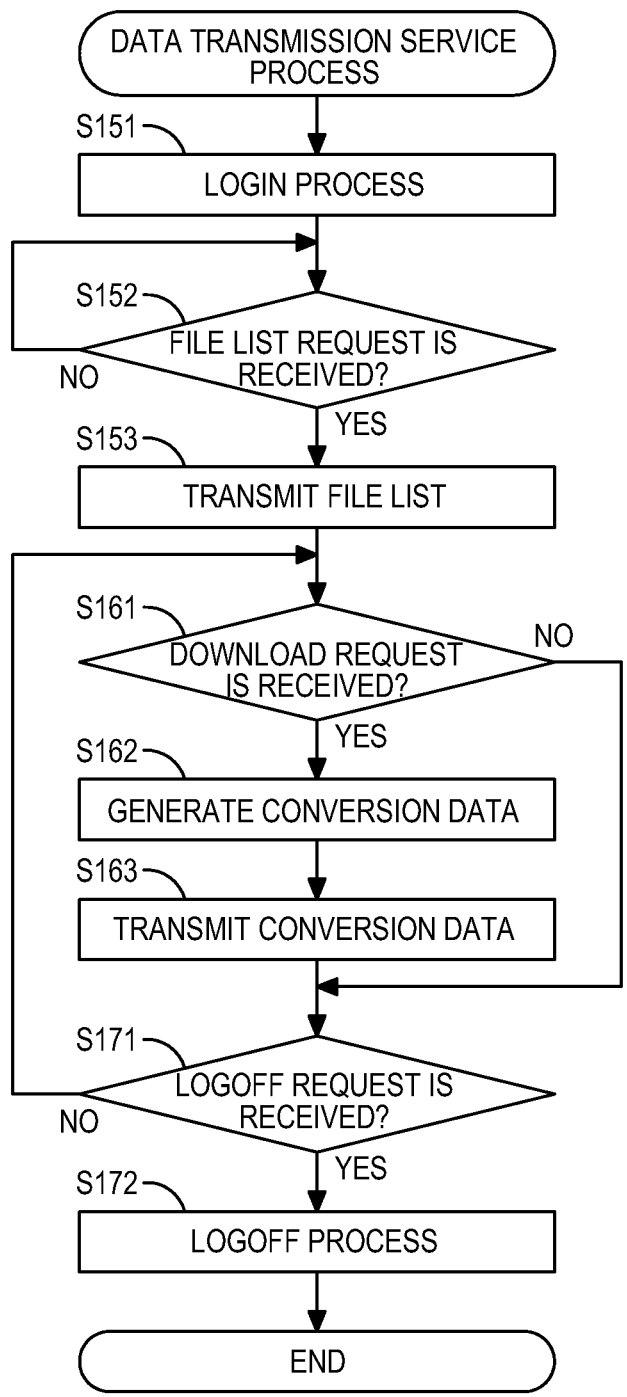
FIG. 7 is a flowchart showing a procedure of a data transmission service process by the server.

Subsequently, a data transmission service process performed by the server 100 to realize the above-described download printing will be described with reference to the flowchart of FIG. 7. The data transmission service process is executed by the CPU 51 when the login request is received. In the following description, it is assumed that the login request is received from the MFP 200.

In the data transmission service process, first, the login process is executed (S151). Specifically, an authentication process is executed based on the login information included in the login request, and the authentication result is transmitted to the MFP 200. Incidentally, in the following description, it is assumed that a user is authenticated by the authentication process, and the description of the case where the user is not authenticated will be omitted.

After S151, it is determined whether the file list request is received from the MFP 200 (S152). When the file list request is not received (S152: NO), the process stands until the file list request is received. When the file list request is received (S152: YES), the server 100 generates a file list of printable image for a user of the user information added to the file list request, i.e., a user allowed to log-in to the server 100, and transmits the file list to the MFP 200 (S153).

After S153, it is determined whether a download request is received from the MFP 200 (S161). If the download request is not received (S161: NO), it is determined whether a logoff request is received (S171). When the logoff request is not received (S171), the process stands until either of the requests is received.

When the download request is received (S161: YES), the image data of the file name included in the download request is read out, and the conversion data, which is image data obtained by converting the image data according to the parameters added to the download request, is generated (S162). That is, according to a print setting desired by the user, new image data is generated from the selected image data to be image data suitable for the capability or the state of the MFP 200. Then, the conversion data generated in S162 is transmitted to the MFP 200 (S163). After S163, the process proceeds to S171.

When a logoff request is received (S171: YES), the logoff process is executed (S172). After S172, the data transmission service process ends. Accordingly, the download printing ends.

Figure 8:
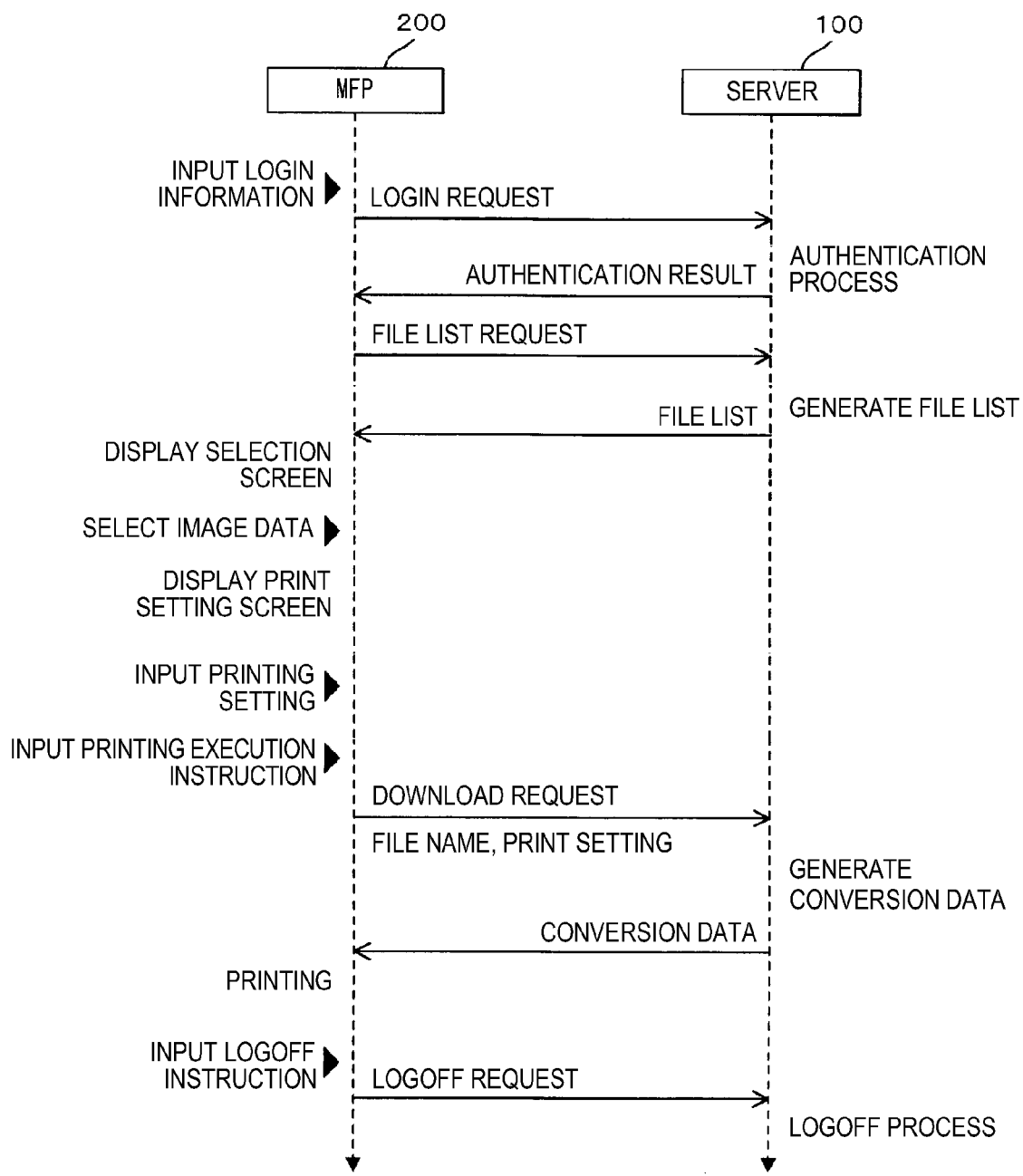
FIG. 8 is a sequence diagram showing a procedure of data communication between the MFP and the server in the download printing according to a second illustrative embodiment.

Subsequently, the detailed procedure according to a second illustrative embodiment of the download printing will be described with reference to the sequence diagram of FIG. 8. In the second illustrative embodiment, the server 100 performs the determination of the parameters which are the conversion conditions. This point is different from the first illustrative embodiment where the MFP 200 performs the determination of the parameters.

In the download printing of the second illustrative embodiment, the procedure in which the image data to be printed in the MFP 200 is selected, the print setting is further executed, and the print execution instruction is input, is the same as that in the first illustrative embodiment. When the print execution instruction is input, the MFP 200 transmits the download request requesting the downloading of the selected image data to the server 100, without determining the parameters. The download request includes the file name of the selected image data and the print settings.

Upon receiving a download request, the server 100 determines the parameters based on the conversion capability of the server 100 and the print settings. The table 321 used for the determination of the parameters is stored in the server 100. After obtaining the status and capability of the MFP 200, these can be utilized to determine the parameters. The procedure for determining parameters may be the same as in the first illustrative embodiment.

After determining the parameters, the server 100 reads out the image data selected by the MFP 200 and generates the conversion data obtained by converting the image data according to the parameters determined by the server 100 itself. Then, the conversion data is transmitted to the MFP 200. After that, the procedure is the same as in the first illustrative embodiment.

As described in detail above, in the image forming system 900 of the present illustrative embodiment, the server 100 or the MFP 200 determines the parameters (an example of conversion conditions) based on the specific information of the MFP 200 such as at least print setting or capability information and the like, and the MFP 200 obtains the conversion data converted by the server 100 according to the parameters. That is, the image data of a suitable size is generated from the image data according to the print setting desired by the user or the capability or the state of the MFP 200. Thus, the possibility that the image data having a size larger than that of the image data necessary for printing in the MFP 200 is transmitted is reduced. As a result, it is possible to reduce the load on the network and the memory of the MFP 200.

While the present invention has been shown and described with reference to certain illustrative embodiments thereof, it will be understood by those skilled in the art that various changes in form and details may be made therein without departing from the spirit and scope of the invention as defined by the appended claims. For example, the image forming apparatus may be copiers, printers, and a FAX machine, in addition to the MFP 200, as long as it has a function of forming an image.

Further, in the illustrative embodiments, during the download printing, the login and logoff are performed to the server 100. However, a user may be identified or each process of the login and the logoff may not be performed. That is, the file list request may be performed after the user information is input, and the user information may be added to the file list request.

Further, in the illustrative embodiments, a user is identified and the user generates the file list of the printable image data. However, the user may not be identified. In this case, the login and logoff are not required. Without adding the user information to the file list request, the server 100 may generate the file list of the image data which can be transmitted to the MFP 200, without any limitation by the user.

Further, in the illustrative embodiments, the server 100 has a function of providing a file list, and a function of providing the image data. However, it is also possible to provide another server having each of the functions. For example, in a system including a server A which provides a file list and a server B which provides the image data, first, the MFP 200 acquires the file list from the server A. In the file list, there is stored the address of a device for storing the image data in respective image data, and the MFP 200 outputs a download request to the server B which stores the image data selected from the file list. Then, the MFP 200 may be configured to print the image data by receiving the image data from the server B.

Further, in the illustrative embodiments, the parameter includes an image size and a color designation. However, the parameter may include only one of them. Further, the parameter may also include other elements. Further, in the illustrative embodiments, the capability of the device and the print settings are used to determine the parameters, but they may be either one. Further, other elements may be used to determine the parameters.

Further, the processes disclosed in the illustrative embodiments may be performed by a CPU, a plurality of CPUs, hardware such as ASIC and the like, or a combination thereof. Further, the processes disclosed in the illustrative embodiments may be implemented in various modes of a method, or a non-transitory recording medium recording a program for executing the process.

What is claimed is:

1. An image forming system comprising an image forming apparatus, and a server configured to communicate with the image forming apparatus, wherein the image forming apparatus comprises:
a printing device;
a first interface configured to communicate with the server;
a first storage device configured to store a print setting for the printing device; and
a first controller configured to:
receive a list of image data stored in the server through the first interface;
receive a selection of image data from the list of image data
determine a conversion condition for converting the selected image data based on the print setting stored in the first storage device after receiving the selection of image data;
transmit, to the server, the determined conversion condition and a request for transmitting the selected image data to the image forming apparatus;
receive, from the server through the first interface, conversion data which is the selected image data converted by the server according to the conversion condition transmitted to the server;
store, in the first storage device, the conversion data received; and
control the printing device to perform printing based on the conversion data stored in the first storage device,
wherein the server comprises:

a second interface configured to communicate with the image forming apparatus;
a second storage device configured to store image data; and
a second controller configured to:
   transmit the list of image data stored in the second storage device to the image forming apparatus through the second interface;
   receive, through the second interface, the request for transmitting image data selected by the first controller and the conversion condition determined by the first controller;
   convert the image data identified in the received request according to the conversion condition determined by the first controller to generate the conversion data; and
   transmit the conversion data to the image forming apparatus through the second interface.

2. The image forming system according to claim 1, wherein the image forming apparatus further comprises:
   an user interface configured to accept an input operation for setting the print setting and for selecting the selected image data from the list of image data.

3. The image forming system according to claim 1, wherein the print setting includes information on an image quality.

4. The image forming system according to claim 1, wherein the first controller is further configured to restrict a settable range of the print setting based on an available area of the first storage device.

5. The image forming system according to claim 1, wherein the first controller is further configured to restrict a settable range of the print setting based on a capability of forming a color image by the printing device.

6. The image forming system according to claim 1, wherein the conversion condition is further determined based on information on a capability of the image forming apparatus.

7. The image forming system according to claim 6, wherein the information on the capability of the image forming apparatus includes an available area of the first storage device.

8. The image forming system according to claim 6, wherein the information on the capability of the image forming apparatus includes information on a capability of forming a color image by the printing device.

9. The image forming system according to claim 1, wherein the first controller is further configured to determine the conversion condition based on the print setting and on information on a conversion capability of the select image data by the server.

10. An image forming apparatus comprising:
an interface configured to communicate with a server;
a printing device;
a storage device configured to store a print setting for the printing device; and
a controller configured to:
   receive a list of image data stored in the server through the interface;
   receive a selection of image data from the list of image data;
   determine a conversion condition for converting the selected image data based on the print setting stored in the storage device after receiving the selection of image data;
   transmit, to the server through the interface, the determined conversion condition and a request for transmitting the selected image data to the image forming apparatus;
   receive, from the server through the interface, conversion data which is the selected image data converted by the server according to the conversion condition transmitted to the server;
   store, in the storage device, the received conversion data; and
   control the printing device to perform printing based on the conversion data stored in the storage device.

11. A server comprising:
an interface configured to communicate with an image forming device;
a storage device configured to store image data; and
a controller configured to:
   transmit a list of image data stored in the storage device to the image forming apparatus through the interface;
   receive, through the interface, a request for transmitting image data selected by a controller in the image forming apparatus and a print setting for a printing device provided in the image forming apparatus;
   determine a conversion condition for converting image data selected by the image forming apparatus, based on the received print setting;
   convert the image data identified in the request received from the image forming apparatus according to the determined conversion condition to generate conversion data from the image data; and
   transmit the conversion data to the image forming apparatus through the interface.

12. The image forming system according to claim 1, wherein the conversion condition includes at least one of image size and color designation.

13. The image forming system according to claim 12, wherein the image size includes at least one of information on number of pixels in lateral direction and information on number of pixels in vertical direction of the image.

14. The image forming system according to claim 1, wherein the print setting includes information on color designation selected from a group consisting of color printing and monochrome printing.

15. The image forming system according to claim 1, wherein the print setting includes information on image quality including resolution of printing.

16. The image forming system according to claim 1, wherein the print setting includes information on sheet size of a sheet on which the selected image data is printed.

17. The image forming system according to claim 14, wherein the first controller sets the conversion condition to indicate converting the selected image data from color image into monochrome image when the print setting includes information on the color designation of monochrome printing.

18. The image forming apparatus according to claim 14, wherein the first controller sets the conversion condition to indicate an image size of an image to be printed by the printing device to be smaller for a case where the print setting includes information on the color designation of monochrome printing than for a case where the print setting includes information on the color designation of color printing.

19. The image forming system according to claim 15, wherein the first controller sets the conversion condition to indicate an image size of an image to be printed by the printing device to be smaller for a case where the print setting includes information on lower resolution of print than for a case where the print setting includes information on higher resolution of print.

20. The image forming system according to claim 16, wherein the first controller sets the conversion condition to indicate an image size of an image to be printed by the printing device to be smaller for a case where the print setting indicates to print on smaller sheet size than for a case where the print setting indicates to print on larger sheet size.

* * * * *